Dec. 23, 1969   W. J. GALE   3,485,511
TRACTORS
Filed April 1, 1968   4 Sheets-Sheet 1
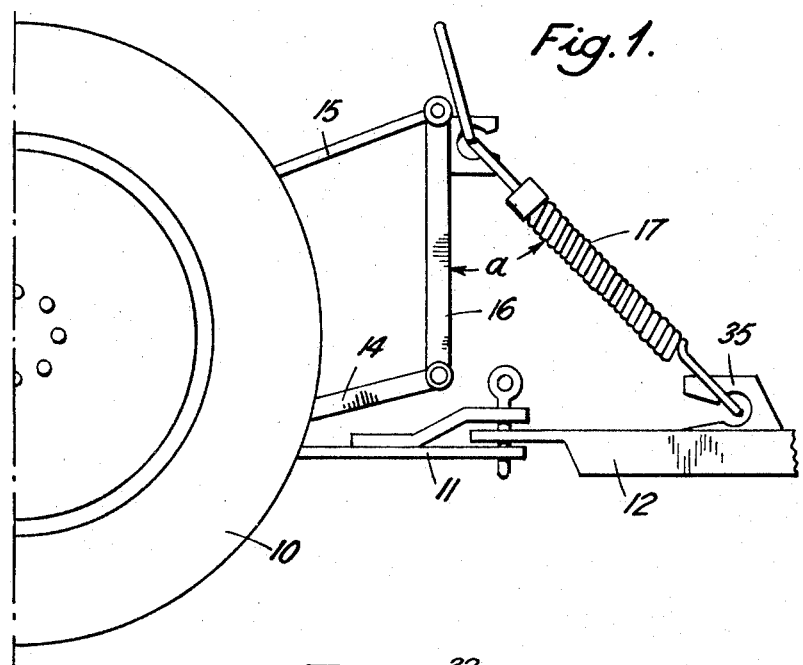
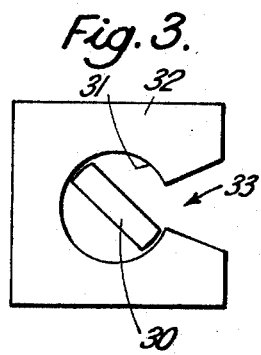
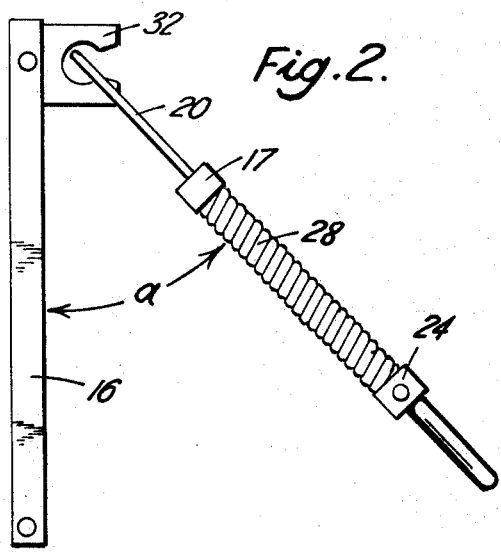
INVENTOR
WILLIAM JAMES GALE
BY mawhinney & mawhinney
ATTYS

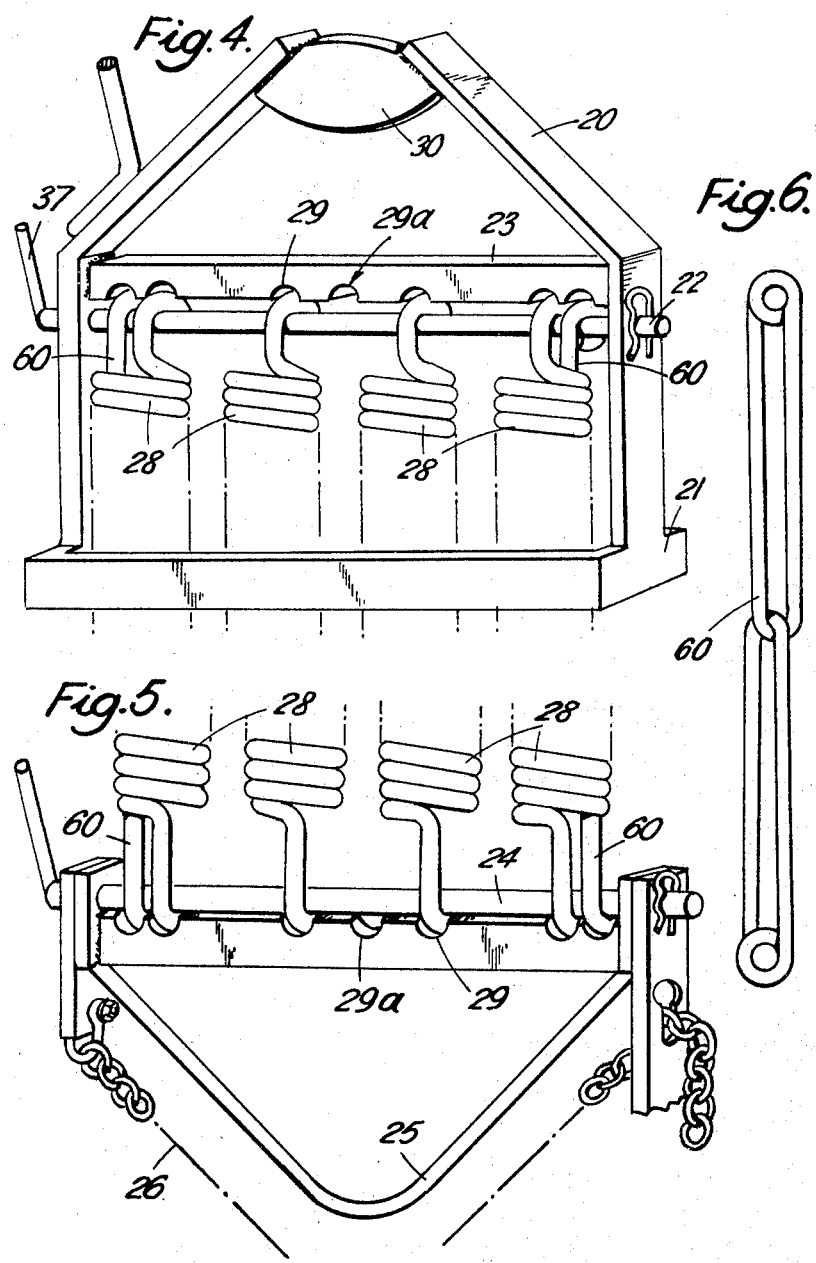

INVENTOR
WILLIAM JAMES GALE
BY Mawhinney & Mawhinney
ATTYS.

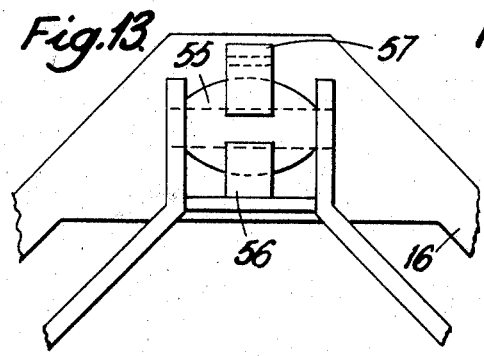
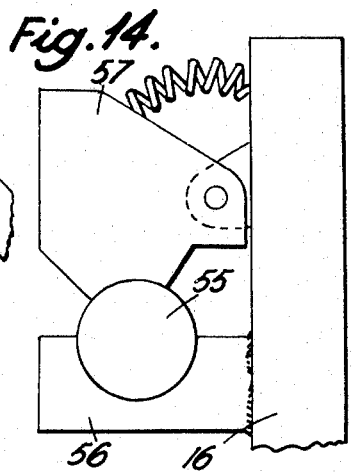
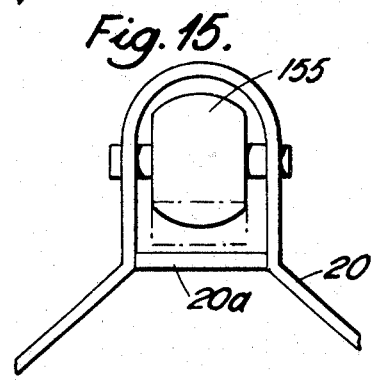
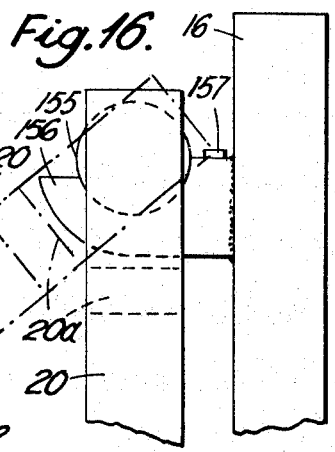
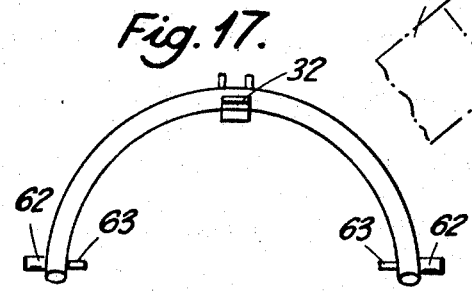
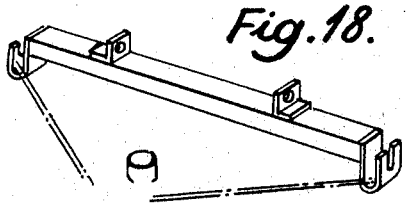

United States Patent Office 3,485,511
Patented Dec. 23, 1969

3,485,511
TRACTORS
William James Gale, Reeves and Fitzray Farms,
Bratton, Westbury, Wiltshire, England
Filed Apr. 1, 1968, Ser. No. 717,770
Claims priority, application Great Britain, Apr. 3, 1967,
15,211/67
Int. Cl. B60d 1/00, 1/14
U.S. Cl. 280—405                                    5 Claims

ABSTRACT OF THE DISCLOSURE

A tractor having a rear tow coupling or draw-bar, and a rear hydraulic life mechanism, in which there is means for transferring to the lift mechanism part of the weight of a trailer vehicle or implement coupled to the tow coupling or draw-bar.

---

The invention relates to tractors (especially but not exclusively, agricultural tractors) of the kind having at the rear both a tow coupling or draw-bar and hydraulic lift mechanism. The lift mechanism may be of the kind having two laterally spaced rearwardly extending draft links with hydraulic lifting means and a central upper rearwardly extending link.

The invention provides a tractor of the above kind having spring transfer means for resiliently transferring to the lift mechanism part of the weight of a trailer vehicle or implement coupled to the tractor coupling or draw-bar.

Preferably the transfer means comprises a resilient upright or upwardly inclined tie (e.g. consisting of or including one or more tension springs) between a part of the trailer behind the coupling and the lift mechanism.

The invention has the advantage that aprt of the weight of the trailer is transferred to the tractor and so increases the tractor adhesion both for driving and for braking. When the lift mechanism is of the three link kind mentioned above the weight is transferred via the lifting means and the hydraulic means may be adjusted to determine the amount of the weight so transferred. The hydraulic means may then be locked. This arrangement has the advantage that the equipment existing on the tractor is used to receive the weight and to determine the amount transferred.

In one form of the invention there is included an upright frame or individual links connecting the lower and upper tractor links and the transfer tie is attached to the upper tractor link or to an upper part of the frame or upright links.

The transefr means may be connected to the tractor or to the trailer (or both) through a releasable coupling arranged to be automatically released in the event that the angle in a vertical plane between the tie and the line of action of the towing force is reduced below a predetermined value as may happen if, for example, the tow coupling becomes disconnected.

The invention includes the combination of a tractor and a trailer implement or vehicle connected by a draw coupling and by load transfer means as above described.

Figure 7:
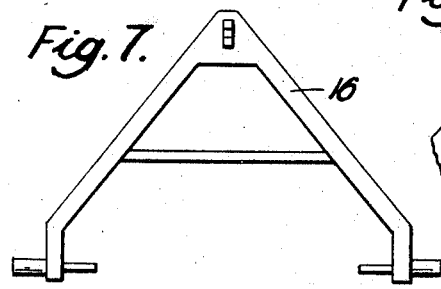
Figure 10:
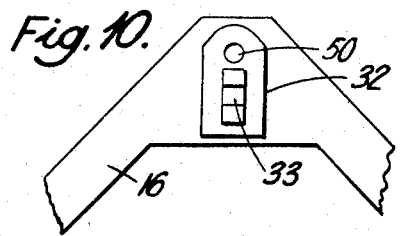
Figure 9:
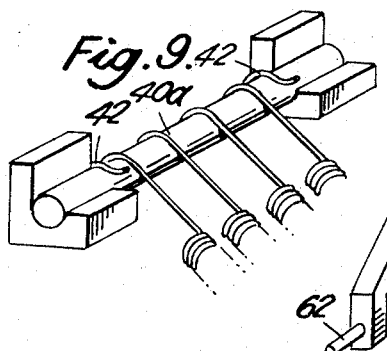
Figure 8:
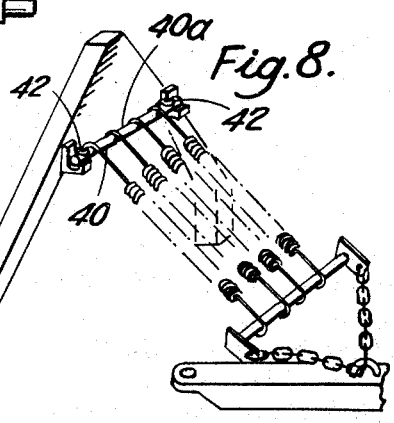
Figure 11:
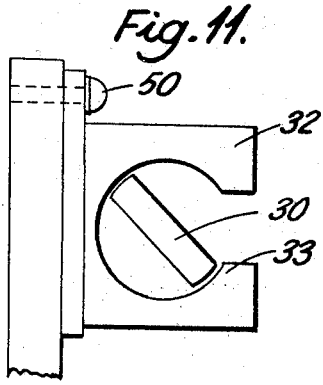
Figure 12:
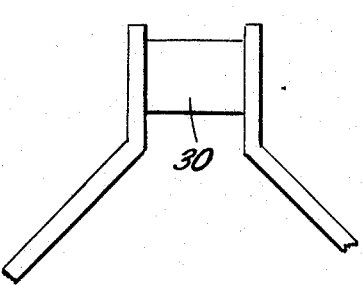

A specific embodiment of the invention and some variations thereof, will now be described by way of example and with reference to the accompanying drawings in which:

FIGURE 1 is a side view showing the couplings between a tractor and a trailer combination, FIGURE 2 is a view, corresponding to FIGURE 1, of the transfer unit used in the combination of FIGURE 1, FIGURE 3 is a view, to an enlarged scale, showing the releasable coupling between the transfer tie and the tractor;

FIGURE 4 is a perspective view looking rearwardly, of the upper end of the transfer tie, FIGURE 5 is a perspective view of the lower end of the transfer tie, FIGURE 6 shows a check link used on the transefr tie, FIGURE 7 is a fore and aft view of the A-frame employed to interconnect the tractor links, FIGURE 8 is a perspective view showing some variations, FIGURE 9 shows the attachments for the upper ends of the springs in FIGURE 8, FIGURE 10 is a view from the rear of the upper end of a modified A-frame, FIGURE 11 is a side view, corresponding to FIGURE 3, of the portion of the A-frame seen in FIGURE 10, FIGRUE 12 is a view from the rear, of the upper end of the transfer tie used with the A-frame of FIGURES 10 and 11, FIGURE 13 is a view from the rear of another form of attachment between the transfer tie and A-frame, FIGURE 14 is a side view of the attachment seen in FIGURE 13, FIGURES 15 and 16 are views, similar to FIGURES 13 and 14 respectively, of another form of attachment between the transfer tie and A-frame, FIGURE 17 shows an alternative to the A-frame used in embodiments shown in the previous figure, and FIGURE 18 shows a spreader.

In FIGURE 1, the draw-bar coupling of the tractor 10 is shown at 11 coupled to the draw-bar 12 of a trailer which may, for example, be a two-or four-wheeled vehicle or a farm implement. The two lower lifting links of the tractor are shown at 14 and the upper link at 15.

In accordance with the invention there is provided a load transfer unit comprising an A frame 16 (see FIGURES 1, 2 and 7) interconnecting the three links with pivotal connections thereto and a transfer tie 17. The tie comprises an upper frame 20 with a divided lower cross bar 21 (shown in FIGURE 4 only), a removable cross-bar 22 and a fixed cross-bar 23, a lower cross-bar 24 (FIGURE 5) and alternative coupling means 25, 26. Extending between the bars 22 and 24 there are four tension springs 28 with end eyes threaded over the bars. The springs are located in spaced relation by notches 29. The number of the springs may be varied and centre notches 29a are provided for use when there is an odd number of springs. To limit the extension of the springs there are provided check links 60 interconnecting the cross-bars 22, 24.

At the apex of the frame 20 there is a cross-plate 30 which engages in a notch 31 in a lug 32 fixed to the top of the A frame 16. This provides a swivel coupling between the tie 17 and the A frame which can automatically become disconnected if the angle α increases to an extent such that the plate can pass through the restricted opening 33 to the notch 31. A similar coupling is provided between D-link 25 at the lower end of the tie and a hook 35 on the trailer draw-bar. The alternative attachment 26 is a chain which can be attached to the draw-bar and is adjustable in length.

The cross-bar 22, which is held against rotation in the frame, is provided with a handle 37 accessible to the tractor driver in the driving seat. The handle, in conjunction with the bar 21 embracing the spring, enables the driver to raise and lower the lower end of the tie and so to effect coupling with a trailer from his seat. To facilitate this operation, the lifting links may be lowered. An automatic coupling may be provided at 11.

FIGURES 7 and 8 show a variation in which the springs are attached, at their upper ends, to a cross-bar 40 on an A-frame connecting the tractor links. The springs are held by a bar 40a (FIGURE 8) which seats in a trough in the A-frame and is held by spring clips 42. In the event that the pull from the springs approaches to the horizontal (i.e. angle α increases) the bar 40a over-rides the lip 43 and becomes detached.

In the variation shown in FIGURES 9 to 11, the lug 32 is pivotally atached to the A-frame about a horizontal fore and aft axis 50.

In the variation shown in FIGURES 13 and 14, the plate 30 is replaced by a ball or barrel shaped member 55 and the lug 32 is replaced by two jaws 56, 57, the upper jaw, 57, being spring-loaded to permit release of the member 55.

Referring to the modifications shown in FIGURES 15 and 16, the attachment of the upper frame 20 to the A-frame 16 comprises a ball 155 on the frame 20 received within a hook 156 on the A-frame. Beneath the ball there is a cross-bar 20A on the frame 20 which, when the frame is upright or in its working position (shown dotted) underlies the hook 156 and prevents the ball lifting out of the hook. If the frame 20 is turned upwardly nearly to the horizontal, the ball may rise out of the hook and the coupling be disconnected. If the frame is turned so far that the top engages the rear of the hook, further movement will lift the ball out of the hook. An adjustable screw 157 is provided o vary the angle at which this occurs.

FIGURE 17 shows an alternative to the A-frame 16 described above. In this alternative, as in the previous construction, there are pins 62, 63 to be received in the hooks of tractor lower links, the pins 62 and 63 being alternatives to suit different tractor constructions. In this embodiment the A-form is replaced by a tube bent to arcuate form.

FIGURE 18 shows a spreader bar which may be used to widen the spread of a chain connection to the draw-bar such as shown in FIGURE 8, thus leaving room for a power take-off shaft to pass and allowing angular movement when cornering.

Various further alternatives are within the invention. Compression springs may be used instead of tension springs, or pneumatic springs may be used. The A-frame decribed may be replaced by an attachment to the upper end of an existing A-frame or equivalent interconnection between the tractor links provided for other purposes.

It is an advantage of the invention that jolting of the draw-bar of the trailer as it travels at high speed over rough ground is reduced. This is of particular advantage when distributing seeds or fertilizers as it enables a more even distribution to be obtained.

I claim:
1. For use with a tractor having two lower lifting links and an upper lifting link, a rear tow coupling or draw-bar, a rear hydraulic lift mechanism and the draw-bar of a trailer vehicle, a load transfer unit comprising an A frame adapted to interconnect the three lifting links with pivoted connections therebetween, a transfer tie connected to said A frame and to the draw-bar of the trailer vehicle comprising an upper frame, a divided lower cross-bar, an upper cross-bar, a lower cross-bar, a plurality of springs extending between and attached to said upper and lower cross-bars, said A frame having adjacent its apex a notch, and a cross-plate engaging in said notch to provide a swivel coupling between said transfer tie and the A frame capable of becoming disconnected if the angle between the A frame and the transfer tie increases such that the cross-plate can pull through the opening of said notch.

2. A load transfer unit as claimed in claim 1, wherein said upper cross-bar is removably carried by said upper frame.

3. A load transfer unit as claimed in claim 1, wherein said notch is formed in a lug fixed to said A frame and said notch has a restricted opening.

4. A load transfer unit as claimed in claim 1, wherein said lower cross-bar is removably carried by a D-link at the lower end of the transfer tie, a hook is adapted to be carried by the trailer vehicle draw bar, a second cross-plate engaging in said hook to provide a swivel coupling between said transfer tie and the hook capable of becoming disconnected if the angle between the transfer tie and the hook increases to such an extent that the second cross-plate can pass out of said hook.

5. A load transfer unit as claimed in claim 1 in which the hydraulic means may be adjusted to determine the amount of the weight so transferred.

References Cited

UNITED STATES PATENTS

| | | | |
|---|---|---|---|
| 2,247,534 | 7/1941 | Von Schlegell | 172—7 |
| 2,673,092 | 3/1954 | Sutherland | 280—406 |
| 3,062,561 | 11/1962 | Wulff | 280—405 |
| 3,341,224 | 9/1967 | Bultheel | 280—405 |
| 3,341,225 | 9/1967 | Bultheel | 280—449 |
| 3,347,560 | 10/1967 | Hodges et al. | 280—405 |

LEO FRIAGLIA, Primary Examiner

U.S. Cl. X.R.

172—7, 11; 280—489